US012320741B2

(12) United States Patent
Sartor et al.

(10) Patent No.: US 12,320,741 B2
(45) Date of Patent: Jun. 3, 2025

(54) POLARIZATION IMAGING SYSTEM AND POLARIZATION IMAGING METHOD

(71) Applicant: Sony Group Corporation, Tokyo (JP)

(72) Inventors: Piergiorgio Sartor, Stuttgart (DE); Alexander Gatto, Stuttgart (DE); Zoltan Facius, Stuttgart (DE); Matthias Schinzel, Stuttgart (DE); Markus Kamm, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 180 days.

(21) Appl. No.: 17/786,545

(22) PCT Filed: Dec. 22, 2020

(86) PCT No.: PCT/EP2020/087620
§ 371 (c)(1),
(2) Date: Jun. 17, 2022

(87) PCT Pub. No.: WO2021/130222
PCT Pub. Date: Jul. 1, 2021

(65) Prior Publication Data
US 2023/0034139 A1 Feb. 2, 2023

(30) Foreign Application Priority Data

Dec. 27, 2019 (EP) .................... 19219840

(51) Int. Cl.
*G01J 3/447* (2006.01)
*G01J 4/04* (2006.01)
(Continued)

(52) U.S. Cl.
CPC .......... *G01N 21/211* (2013.01); *G01J 3/447* (2013.01); *G01J 4/04* (2013.01); *G01B 11/0625* (2013.01);
(Continued)

(58) Field of Classification Search
CPC .......... G01N 21/211; G01N 2021/213; G01N 21/21; G01J 3/447; G01J 4/04; G01J 4/00;
(Continued)

(56) References Cited

U.S. PATENT DOCUMENTS 5,910,841 A 6/1999 Masao
6,522,407 B2 2/2003 Everett et al.
(Continued)

FOREIGN PATENT DOCUMENTS

JP H05142141 A 6/1993
JP H11281944 A * 10/1999 ............. G01N 15/08
(Continued)

OTHER PUBLICATIONS

International Search Report and Written Opinion mailed on Mar. 3, 2021, received for PCT Application PCT/EP2020/087620, filed on Dec. 22, 2020, 11 pages.
(Continued)

*Primary Examiner* — Michelle M Iacoletti
*Assistant Examiner* — Judy Dao Tran
(74) *Attorney, Agent, or Firm* — XSENSUS LLP

(57) ABSTRACT

The present disclosure generally pertains to a polarization imaging system having: an imaging portion having a color channel element of a first color type and a color channel element of a second color type; and a light polarization portion configured to: provide a first light polarization of a first polarization type for the first color type and a second light polarization of the first polarization type for the second color type; and convert a second polarization type into the first polarization type, whereby the second polarization type is detectable in the imaging portion.

20 Claims, 6 Drawing Sheets

(51) Int. Cl.
*G01N 21/21* (2006.01)
*G01B 11/06* (2006.01)
*G01J 4/00* (2006.01)
*G06T 3/4015* (2024.01)

(52) U.S. Cl.
CPC .............. *G01B 11/065* (2013.01); *G01J 4/00* (2013.01); *G01N 2021/213* (2013.01); *G06T 3/4015* (2013.01)

(58) Field of Classification Search
CPC ........ G01J 3/0224; G01J 3/2823; G01J 3/513; G06T 3/4015; G02B 21/0092; G01B 11/0625; G01B 11/065
See application file for complete search history.

(56) References Cited

U.S. PATENT DOCUMENTS

| | | | | |
|---|---|---|---|---|
| 7,285,767 | B2 * | 10/2007 | Harding | ............. G01B 11/2509 |
| | | | | 356/369 |
| 7,289,211 | B1 | 10/2007 | Walsh, Jr. et al. | |
| 7,420,675 | B2 | 9/2008 | Giakos | |
| 11,016,022 | B2 * | 5/2021 | Yurt | ..................... G02B 21/361 |
| 2009/0079982 | A1 * | 3/2009 | Lefaudeux | ................ G01J 4/04 |
| | | | | 356/364 |
| 2013/0076932 | A1 * | 3/2013 | Chhibber | ................ G06V 40/162 |
| | | | | 348/222.1 |
| 2013/0100333 | A1 * | 4/2013 | Awatsuji | ................ G01N 21/21 |
| | | | | 348/335 |
| 2013/0307950 | A1 * | 11/2013 | Aharon | ................ A61B 5/0077 |
| | | | | 348/65 |
| 2015/0346083 | A1 * | 12/2015 | Matsumoto | ........ G01N 21/8851 |
| | | | | 356/369 |
| 2018/0075615 | A1 * | 3/2018 | Myokan | .................. G06T 7/557 |
| 2018/0292310 | A1 | 10/2018 | Kojima et al. | |
| 2022/0279158 | A1 * | 9/2022 | Hong | ..................... G02B 30/60 |

FOREIGN PATENT DOCUMENTS

| | | | |
|---|---|---|---|
| JP | 2003-35613 | A | 2/2003 |
| JP | 2004062178 | A | 2/2004 |
| JP | 2012-10757 | A | 1/2012 |
| JP | 2013505459 | A | 2/2013 |
| JP | 2015227827 | A | 12/2015 |
| JP | 2019075703 | A | 5/2019 |
| JP | 2019184977 | A | 10/2019 |
| WO | WO-2012002207 | A1 | 1/2012 |
| WO | WO-2017099253 | A1 | 6/2017 |
| WO | WO-2018003359 | A1 | 1/2018 |
| WO | 2019/051301 | A1 | 3/2019 |
| WO | WO-2019176209 | A1 | 9/2019 |

OTHER PUBLICATIONS

Qi et al., "Mueller polarimetric imaging for surgical and diagnostic applications: a review", Journal of Biophotonics, vol. 10, Available Online At: https://onlinelibrary.wiley.com/doi/full/10.1002/jbio.201600152, May 2, 2017, pp. 950-982.

Ghosh et al., "Tissue polarimetry: concepts, challenges, applications, and outlook", Journal of Biomedical Optics, vol. 16, No. 11, Available Online At: https://www.spiedigitallibrary.org/journals/Journal-of-Biomedical-Optics/volume-16/issue-11//110801/Tissue-polarimetry-concepts-challenges-applications-and-outlook/10.1117/1.3652896.full?SSO=1, Nov. 2011, pp. 110801-1-110801-29.

* cited by examiner

POLARIZATION IMAGING SYSTEM AND POLARIZATION IMAGING METHOD

CROSS-REFERENCE TO RELATED APPLICATIONS

The present application is based on PCT filing PCT/EP2020/087620, filed Dec. 22, 2020, which claims priority to EP 19219840.6, filed Dec. 27, 2019, the entire contents of each are incorporated herein by reference.

TECHNICAL FIELD

The present disclosure generally pertains to a polarization imaging system and a polarization imaging portion.

TECHNICAL BACKGROUND

Generally, polarization imaging is known. For example, polarization filters may be applied to cameras, for example for filtering a reflectance of a material (e.g. water).

Moreover, polarization imaging is used in medical devices, e.g. in surgical devices being used during an operation, for example a monocular endoscope, or in diagnostic devices, and the like.

In order to have a broader insight e.g. in tissue properties of a patient (or anatomic features), which may not be visible to the human eye, polarization imaging may be utilized, since different tissues may typically have different reflectance properties for differently polarized light.

In such systems, changes of isotropic and anisotropic (optical) properties of tissue may be analyzed.

Hence, for optically resolving a sample (or an anatomic part of a patient) in a way to distinguish different tissues from each other, polarization imaging, e.g. Mueller polarimetry, is a widely used tool.

Other optical systems may be based on fluorescence and/or marker substances for enhancing a visibility of a tissue. Thereby, a real-time imaging may be realized.

Although there exist techniques for Mueller polarimetry imaging, it is generally desirable to provide a polarization imaging system and a polarization imaging method.

SUMMARY

According to a first aspect the disclosure provides a polarization imaging system comprising: an imaging portion having a color channel element of a first color type and a color channel element of a second color type; and a light polarization portion configured to: provide a first light polarization of a first polarization type for the first color type and a second light polarization of the first polarization type for the second color type; and convert a second polarization type into the first polarization type, whereby the second polarization type is detectable in the imaging portion.

According to a second aspect the disclosure provides a polarization imaging method comprising: providing a first light polarization of a first polarization type for a color channel element of a first color type and a second light polarization of the first polarization type for a color channel element of a second color type; and converting a second polarization type into the first polarization type, whereby the second polarization type is detectable in an imaging portion including the first and the second color channel elements.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
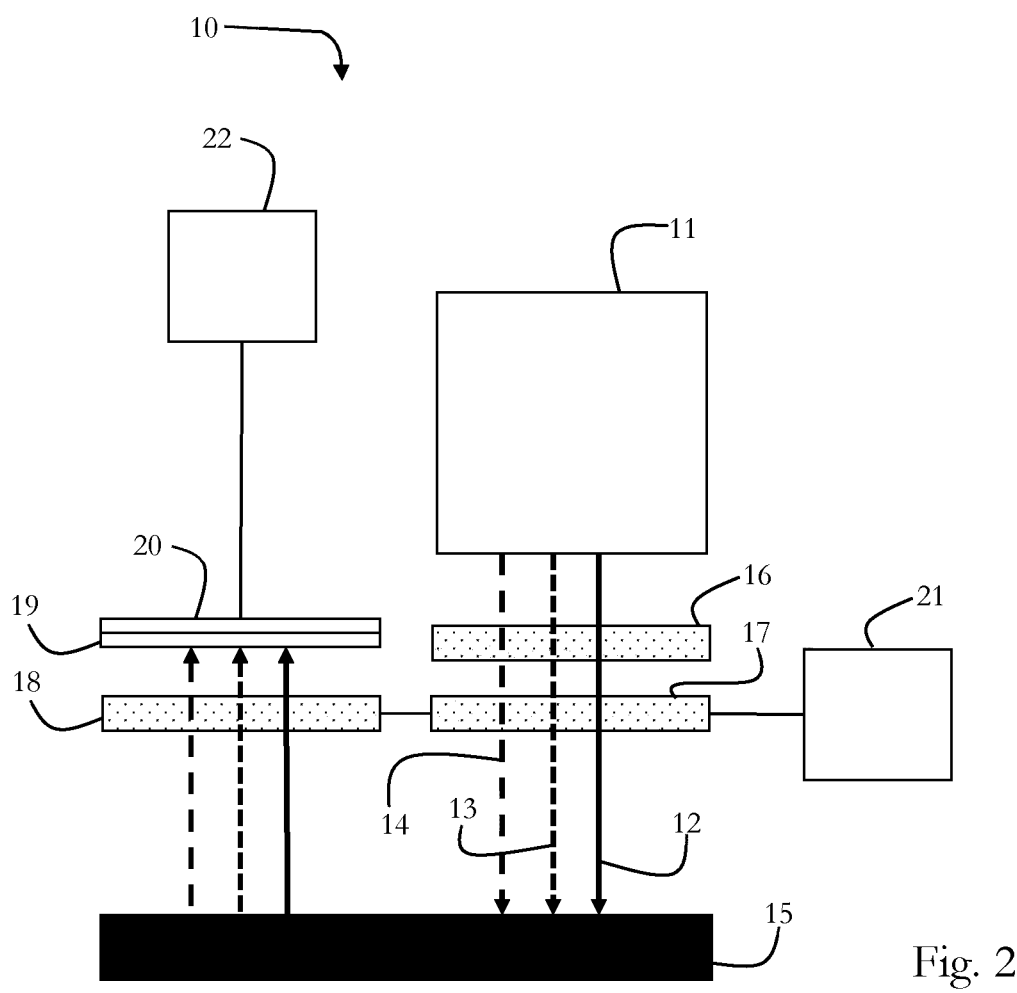
FIG. 2 depicts an embodiment of a polarization imaging system according to the present disclosure.

Before a detailed description of the embodiments under reference of FIG. 2 is given, general explanations are made.

As mentioned in the outset, polarization imaging systems are generally known, for example in surgical devices, in which they are used for helping a surgeon distinguishing different tissues of a patient, and the like.

Generally, in such a situation, it may be crucial for the patient (or for his or her health) that the surgeon gets relevant polarization information as quickly as possible.

It has, however, been recognized, that existing Mueller polarimetry system may work time-inefficiently, since the number of acquisitions they need to get sufficient polarization information may be too high, since, for example elements of a Mueller matrix may be measured in consecutive acquisition steps.

Therefore, it is desirable to reduce the number of acquisitions in order to decrease the time for getting sufficient polarization information.

Moreover, it is desirable to increase a resolution of known polarization imaging systems, for example for diagnostics, but also for surgical devices.

Furthermore, a fluorescence/marker-less real-time imaging method is not known, whereas this is generally desirable, for example to decrease a health risk due to marker substances, to reduce a surgery (or a diagnostic) by a step, and the like.

Therefore, some embodiments pertain to a polarization imaging system having: an imaging portion having a color channel element of a first color type and a color channel element of a second color type; and a light polarization portion configured to: provide a first light polarization of a first polarization type for the first color type and a second light polarization of the first polarization type for the second color type; and convert a second polarization type into the first polarization type, whereby the second polarization type is detectable in the imaging portion.

The imaging portion may be based on a known semiconductor technology, diode technology, and the like, such as CMOS (complementary metal oxide semiconductor), CCD (charge coupled device), and the like.

Moreover, the imaging portion may include at least one SPAD (single photon avalanche diode), CAPD (current assisted photonic demodulator), and the like.

Hence, the imaging portion may include a plurality of imaging elements (e.g. pixels) (at least two) based on such technologies, which may be arranged in an array, a grid, a pattern, or the like.

Each imaging element may be sensitive to a predetermined wavelength (range), or, in other words, to a predetermined color type (e.g. green (e.g. a wavelength of five hundred and ten to five hundred and seventy nanometer), red (e.g. a wavelength of six hundred and ten to seven hundred nanometers), blue (e.g. a wavelength of four hundred to four hundred and eighty nanometers), infrared), wherein also (for humans) non-visible wavelength ranges may refer to a color type (e.g. infrared, ultraviolet). Hence, to such an imaging element, it may be referred to a color channel element.

Generally, each imaging element may be sensitive to a different color type, without limiting the present disclosure in that regard. For example, (at least) two color channel elements may be sensitive to (roughly) the same wavelength range, and other color channel elements may be sensitive to at least one different wavelength range.

However, for an imaging portion according to the present disclosure, it may be sufficient to have a color channel element of a first color type and a color channel element of a second color type.

The polarization imaging system may further include a light polarization portion.

The light polarization portion may include a static polarizer portion including at least one polarizer for each color channel element.

Each polarizer of the static polarizer portion may be arranged in an array, a grid, a pattern, and the like, such that an arrangement of the static polarizer portion may be corresponding to at least a part of the imaging portion.

Each polarizer may be adapted to adjust a predetermined phase shift to light being incident on or passing the polarizer.

This may be realized by a polarization filter, such as a (wave) retarder, a waveplate, an absorptive polarizer, a beam-splitting polarizer, a birefringent polarizer, a thin film polarizer, a wire-grid polarizer, and the like.

Moreover, this may be realized by an adaptive polarizer, such as a tunable polarizer (e.g. a liquid crystal polarizer) having a fixed polarization property, e.g. due to a predetermined (fixed) voltage being applied to the tunable polarizer.

As discussed, for each color channel element, a polarizer may be provided. Hence, for each color channel element a predetermined polarization of light being incident may be realized, wherein the respective polarization for each color channel element may be different.

For example, in a case of two color channel elements of different color types, for a first color type a first polarizer generating (or filtering) a linear polarization (first polarization type) of zero degrees and for a second color type a second polarizer generating (or filtering) a linear polarization of ninety degrees may be provided.

Moreover, each polarizer may be provided to each imaging element in a way that light passing the respective polarizer may be (directly) incident on the imaging element.

In some embodiments, a static polarizer portion may be provided to one (or to each) color channel element.

For example, a polarizer may be stacked on an imaging element, or in general, the static polarizer portion may be stacked onto the imaging portion, such that, as discussed above, the static polarizer portion may correspond to at least a part of the imaging portion (or a subset of the color channel elements) or to the whole imaging portion (i.e. for each color channel element, a polarizer may be provided).

Thereby, the light polarization portion may be configured to provide a first light polarization of a first polarization type for the first color type and a second light polarization of the first polarization type for the second color type.

A polarization type may include an intrinsic property of light in which way the light is polarized. For example, known polarization types may include a linear polarization and an elliptic polarization, wherein a circular polarization may be a special case of an elliptic polarization.

In this context, the first and/or the second light polarization of the first and/or the second polarization type may refer to a specific value of polarization.

For example, the first polarization type may include a linear polarization, and the first polarization may include ninety degrees, zero degrees, forty-five degrees, and the like.

As discussed, the first polarization type may be detectable in the imaging portion.

Therefore, the light polarization portion may be configured to convert a second polarization type into the first polarization type.

The second polarization type may be different from the first polarization type. For example, the second polarization type may include a circular polarization, as discussed above.

A typical polarizer, as it is described above, may only be configured to transmit a linear polarization type. Therefore, in order to detect, with an imaging portion according to the present disclosure, a circular polarization, which may encode (or include) (additional) particular information (e.g. about an object), the circular polarization may be converted into a linear polarization.

For this purpose, the light polarization portion may include a converting polarizer portion.

The converting polarizer portion may include at least one converting polarizer and may be provided (with respect to a direction of passing light) in front of the static polarizer portion.

The at least one converting polarizer may include a polarization filter, such as a (wave) retarder, a waveplate, an absorptive polarizer, a beam-splitting polarizer, a birefringent polarizer, a thin film polarizer, a wire-grid polarizer, and the like.

Moreover, the at least one converting polarizer may include an adaptive polarizer, such as a tunable polarizer (e.g. a liquid crystal polarizer) having a fixed polarization property, e.g. due to a predetermined (fixed) voltage being applied to the tunable polarizer.

With such a configuration, multiple (at least two) image acquisitions of a polarization imaging system may be performed, each with different polarization conditions.

For example, in a first image acquisition blue light emitted by a light source (and reflected by an object to be imaged) may have a parallel polarization (linear with zero degrees), wherein green light may have a rectangular polarization (linear ninety degrees).

The blue light may be detected by a blue color channel element on which a wire-grid polarizer having a ninety degree wiring is stacked, and the green light may be detected by a green color channel element on which a wire-grid polarizer having a zero degree wiring may be stacked.

It should be noted that the angles given here describing the linear polarizations and the wirings may be given with respect to a reference coordinate system and may not refer to absolute values.

Thereby, two polarization properties may be acquired in the first acquisition.

The polarization properties may correspond to an entry of a Mueller matrix, as will be discussed later.

In a second image acquisition, the blue light may have a circular polarization and the green light may have a linear polarization of zero degrees. Since the blue light may only be detectable in the blue color channel element (which may additionally only detect a linear polarization of zero degrees due to the stacking of the polarizer) and the green light may be detectable only in the green color channel element (which may additionally only detect a linear polarization of ninety degrees), a tunable polarizer may be adapted (in this second acquisition) to shift a phase of the incoming (blue and green) light by ninety degrees.

Thereby, the circular polarization of the blue light may be converted into a parallel (linear) polarization and the parallel (linear) polarization of the green light may be converted into a rectangular (linear) polarization. Thereby, the amount of blue light having a circular polarization, which is reflected by the object, and the amount of green light having a parallel polarization may be detected, and, moreover, additional entries of the (said) Mueller matrix may be found.

Thereby, a sufficient synchronization of the polarizers may be achieved, and, moreover, a real-time imaging may be realized.

However, in some embodiments, as indicated above, a static polarizer portion may be provided for each color channel, such that for each color channel a (relevant) polarization may be detected.

Thereby, according to the present disclosure, with a sufficient number of acquisitions, a full polarization information (i.e. every entry of the Mueller matrix) may be found, and, moreover, a colored image may be acquired at the same time.

A Mueller matrix may be known as a four times four (symmetric) matrix having different polarization properties as elements, such as transmittance, reflectance, linear extinction, circular extinction, circular, retardance, depolarization, and the like. Generally, the Mueller matrix is known to the skilled person in the field of polarization.

By determining the (values of the) elements, full (relevant) polarization information of light incident on an imaging portion may be acquired.

A possibility for determining the elements of the Mueller matrix is by determining different light polarization (type) intensities.

For example, intensities of parallel polarized light, of rectangular polarized light, of forty-five degrees polarized light, of one hundred and thirty-five degrees polarized light may be determined. With this information, a reduced Mueller matrix (three times three) may be determined.

By additionally determining an intensity of right and left polarized light, the full Mueller matrix may be determined.

For determining the full Mueller matrix, four stokes vectors ($I_i$, $Q_i$, $U_i$, $V_i$) may be determined based on the measured intensity values, wherein the index i may lie between one and four, thereby indicating the respective stokes vector.

From the four stokes vectors, the Mueller matrix may be calculated by a transformation, as it is generally known.

In some embodiments, the polarization imaging system further includes at least one tunable polarizer for converting the second polarization type into the first polarization type, as discussed herein.

In some embodiments, the first and the second polarization type include a linear and an elliptic polarization, as discussed herein, wherein the elliptic polarization may further include a circular polarization, as discussed herein.

In some embodiments, the imaging portion includes a Bayer image sensor. A Bayer image sensor, as it is generally known, may include four color channel elements with three different color types, for example two green color channel elements, a red color channel element, and a blue color channel element (which are arranged, for example, in one rectangular (quadratic) region). Thereby, the space of the imaging portion can be fully used and the information of the green wavelength spectrum can be enhanced based on the two green color channel elements.

On each color channel of a Bayer image sensor a static polarizer portion may be stacked, wherein the static polarizer portion may have four wire-grid polarizers, such as a wire-grid polarizer with a zero degrees wiring, a wire-grid polarizer with a forty-five degrees wiring, a wire-grid polarizer with a ninety degrees wiring, and a wire-grid polarizer with a one hundred thirty-five degrees wiring.

Figure 1:
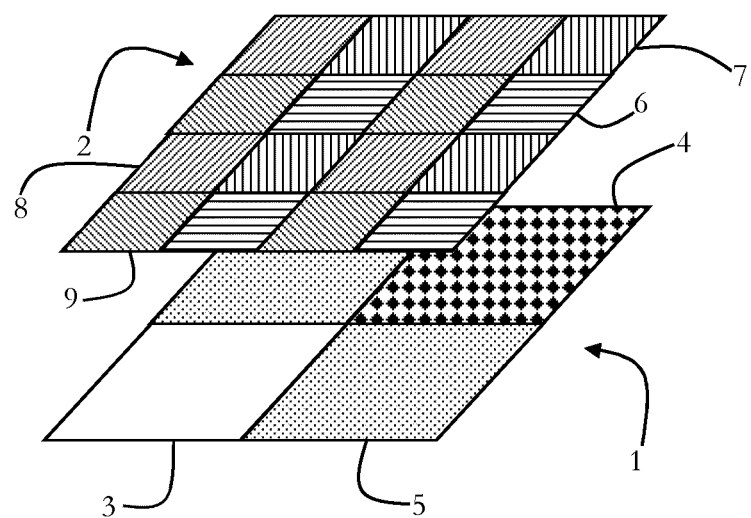
FIG. 1 depicts a Bayer image sensor with four static polarizer portions according to the present disclosure.

FIG. 1 depicts an embodiment of a Bayer image sensor 1 with a four static polarizer portions 2 as described above.

The Bayer image sensor 1 has four color channel elements, a red color channel element 3, a blue color channel element 4, and two green color channel elements 5, which are arranged in a rectangular (quadratic) region, wherein the two green color channel elements 5 are arranged opposite to each other, without limiting the present disclosure in that regard.

Each static polarizer portion 2 includes four wire-grid polarizers including a wire-grid polarizer with zero degrees wiring 6, a wire-grid polarizer with forty-five degrees wiring 7, a wire-grid polarizer with ninety degrees wiring 8, and a wire-grid polarizer with one hundred and thirty-five degrees 9.

For illustrational purposes only, it is depicted that the static polarizer portions 2 are not stacked on the Bayer image sensor 1. However, as discussed, in some embodiments, the static polarizer portion may be (directly or indirectly) stacked on a color channel element, or, the static polarizer portion may be provided at least close enough to the color channel element, such that light is transmitted to the required color channel imaging element and deflection effects may be neglectable.

In some embodiments, for each color channel element a different polarization is provided, as discussed herein, such as a parallel polarization for the first color channel, a rectangular polarization for the second color channel, and the like.

In the case of a Bayer image sensor, for the first green color channel, a polarization of forty-five degrees may be provided, for the second green color channel, a polarization of ninety degrees may be provided, for the blue color channel a polarization of zero degrees may be provided, and for the red color channel a polarization of one hundred and thirty-five degreed may be provided.

For a consecutive acquisition, other polarizations may be provided for each color channel element.

It should be noted that the present disclosure is not limited to the polarizations of zero, forty-five, ninety, and one hundred and thirty-five, as and polarization angles may be envisaged, such as one, two, three, and four degrees, if necessary.

In general, the polarization may as well be the same for each color channel or for at least two color channels.

In some embodiments, at least one of the first and the second polarization is representative of an element of a polarization matrix, such as a Mueller matrix, as discussed above, wherein the present disclosure is not limited to the case of a Mueller matrix, as any mathematical (or physical) expression describing a polarization of light may be adopted.

In some embodiments, the polarization imaging system further includes: a light source configured to generate light of the first color type and to generate light of the second color type.

The light source may include a narrow band light source, a laser, such as a diode laser, a (plurality of) VCSELs (vertical-cavity surface-emitting laser(s)), and the like. Moreover, different types of e.g. diodes may be included for generating the different color types.

Moreover, the light source may be realized by a broad band (white light) illumination, for example in a visible range (e.g. four hundred to seven hundred and eighty nanometers).

With the light source, an object may be illuminated, irradiated, and the like, such that reflected (polarized) light from the object may be detected by an imaging portion according to the present disclosure.

In some embodiments, the polarization imaging system further includes: a polarizer configured to adjust a source polarization of the first polarization type for the generated light.

The static polarizer may refer to a similar (static or tunable) polarizer, as it is discussed above, and, therefore, a repetitive description of such an element is omitted.

Thereby, the object may be irradiated with light of the source polarization (or polarization type), such that the reflected light may be detectable in the imaging portion.

In some embodiments, the source polarization of the light of the first color type differs from the light of the second color type.

Thereby, as discussed above, for each color channel, a respective polarization may be provided.

Some embodiments pertain to a polarization imaging method including: providing a first light polarization of a first polarization type for a color channel element of a first color type and a second light polarization of the first polarization type for a color channel element of a second color type; and converting a second polarization type into the first polarization type, whereby the second polarization type is detectable in an imaging portion including the first and the second color channel elements, as discussed herein.

The polarization imaging method may be performed by a polarization control circuitry which may be configured to control a light source according to the present disclosure, and to control and time tunable polarizers according to the present disclosure for providing and/or converting the respective polarizations.

Such a polarization control circuitry may be adapted to control polarization properties of the tunable polarizers (e.g. liquid crystal modulators by applying a current) and may be configured to switch between the respective polarizations and polarization types. A switching speed may be within a Kilohertz range, without limiting the present disclosure in that regard. Moreover, the polarization control circuitry may be configured to control a timing between multiple tunable polarizers.

In some embodiments, the first and the second polarization type include a linear and an elliptic polarization, as discussed herein. In some embodiments the imaging portion includes a Bayer image sensor, as discussed herein. In some embodiments, the Bayer image sensor includes two green color channel elements, a red color channel element, and a blue color channel element, as discussed herein. In some embodiments, for each color channel element a different polarization is provided, as discussed herein. In some embodiments at least one of the first and the second polarization is representative of an element of a polarization matrix, as discussed herein. In some embodiments, the polarization matrix includes a Mueller matrix, as discussed herein. In some embodiments, the polarization imaging method further includes: generating light of the first color type; and generating light of the second color type, as discussed herein. In some embodiments, polarization imaging portion includes adjusting a source polarization of the first polarization type for the generated light, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

FIG. 2 depicts an embodiment of a polarization imaging system 10 according to the present disclosure in a block diagram.

The polarization imaging system 10 includes a light source 11 configured to emit light of three different color channels 12, 13, and 14 onto an object 15 (which is not necessarily included in the polarization imaging system 10, but could be any kind of object).

Between the light source 11 and the object 12, a first liquid crystal modulator 16 and a second liquid crystal modulator 17 are placed as polarizers.

The first liquid crystal modulator 16 is adapted to provide a fixed polarization of ninety degrees to passing light, and the second liquid crystal modulator 17 is switchable in its polarization properties, i.e. the second liquid crystal modulator 17 includes a bistable liquid crystal being switchable to apply a phase shift of either zero degrees or of negative forty-five degrees to incident light.

Moreover, the polarization imaging system 10 includes a third liquid crystal modulator 18 being placed in an optical path after the object 15 for converting a circular polarization into a linear polarization, such that the circular polarization may be (indirectly) detected in an imaging portion 19 stacked with a polarizer portion 20, as described with respect to FIG. 1.

Furthermore, the polarization imaging system 10 includes a polarization circuitry 21 configured to control polarizer properties of the liquid crystal modulators 17 and 18, wherein the polarization imaging system 10 further includes an image processing circuitry 22 for processing the image data generated in the imaging portion 20.

Figure 3:
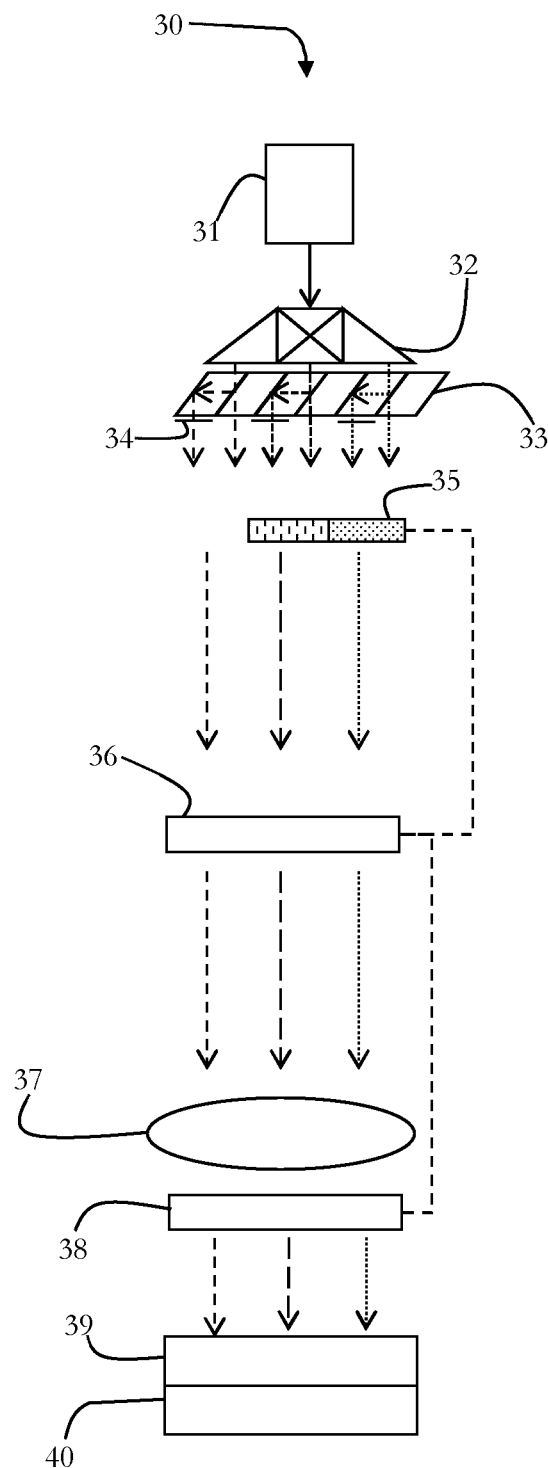
FIG. 3 depicts a further embodiment of a polarization imaging system according to the present disclosure.

FIG. 3 depicts a further embodiment of a polarization imaging system 30 according to the present disclosure and gives an example for controlling tunable polarizers in the light path.

The polarization imaging system 30 includes a halogen (Xenon) light source 31 (broad band light source as discussed above) generating (unpolarized) light. The light is directed onto a dichroic beam splitter prism 32, whereafter the light passes a polarization recycling prism 33.

In the beam splitter prism 32, the light is split into three color channels, i.e. blue, green, and red (arrows from left to right, indicated with different hatchings).

The polarization recycling prism 33 is configured such that a part of each color channel is diverted, such that roughly half of the intensity of each color channel passes a respective forty-five degrees $\lambda/2$-waveplate 34 of which three (one for each color channel, in other words: every second exit) are placed after (with respect to an optical path) the polarization recycling prism 33.

Thereby, a linear polarization of each color channel of zero degrees is generated.

By using a polarization recycling prism 33 with a λ/2-waveplate 34, a light loss due to polarization (which may be roughly fifty percent in the art) is minimized. Hence, the usage of a polarization recycling prism is not limited to this embodiment, but may be applied in other embodiments as well.

For example, a polarization recycling prism according to the present disclosure may have more or less exits, depending on the amount of color channels used in a respective application, wherein after a subset (or after each) of the exits, a λ/2-waveplate may be provided, or wherein, in some embodiments, for every second exit a λ/2-waveplate is provided.

After that, a first liquid crystal modulator 35 is placed through which light of the green color channel and of the red color channel can pass.

Moreover, a second liquid crystal modulator 36 for every color channel is placed after the first liquid crystal modulator 35.

The first liquid crystal modulator 35 and the second liquid crystal modulator 36 are coupled, such that a polarization property of the first liquid crystal modulator 35 is made dependent on a polarization property of the second liquid crystal modulator 36. The respective polarizations may be controlled by a polarization control circuitry (not depicted), as discussed above.

In particular, the second liquid crystal modulator 36 includes a broadband λ/4 retarder with two orientations, namely zero degrees and forty-five degrees. If the orientation zero degrees is applied, a linear input polarization of light is kept. If the orientation forty-five degrees is applied, linear polarization is converted to circular polarization.

Moreover, the first liquid crystal modulator 35 includes two switchable λ/2-waveplates.

If the second liquid crystal modulator 36 is adapted for an orientation of zero degrees, the first liquid crystal modulator is configured to switch the green color channel to a linear polarization of forty-five degrees and the red color channel to a linear polarization of ninety degrees.

If the second liquid crystal modulator 36 is adapted for an orientation of forty-five degrees, the first liquid crystal modulator is configured to keep the linear polarization of zero degrees for all color channels.

Thereby, a sufficient number of polarization states are generatable.

Moreover, after the second liquid crystal modulator, an object 37 can typically be placed, wherein after the object, a third liquid crystal modulator 38 is provided including a broadband λ/4 retarder with two orientations, namely zero degrees and forty-five degrees.

As the first liquid crystal modulator 35, the polarization state of the third liquid crystal modulator 38 is dependent of the second liquid crystal modulator 36.

If the second liquid crystal modulator 36 is adapted for an orientation of zero degrees, the third liquid crystal modulator 38 is configured to keep the linear polarization(s) of the incoming light by providing a polarization orientation of zero degrees, as well.

If the second liquid crystal modulator 36 is adapted for an orientation of forty-five degrees, i.e. if circular polarized light is generated in the second liquid crystal modulator 36, the third liquid crystal modulator 38 is configured to convert the circular polarizations) into (a) linear polarization(s) by providing a polarization orientation of forty-five degrees, as well.

As discussed above, the respective polarizations are controlled by a polarization control circuitry.

After the third liquid-crystal modulator 38, a polarizer portion 39 stacked on an imaging portion 40, as discussed with respect to FIG. 1 is placed for reading the intensity of each incoming polarization state, as discussed herein.

With such a configuration, sufficient polarization information may be acquired within four consecutive imaging frames (or acquisitions), wherein it is generally known in the art to acquire sufficient polarization information within eight frames, as will now be discussed with respect to FIG. 4.

Figure 4:
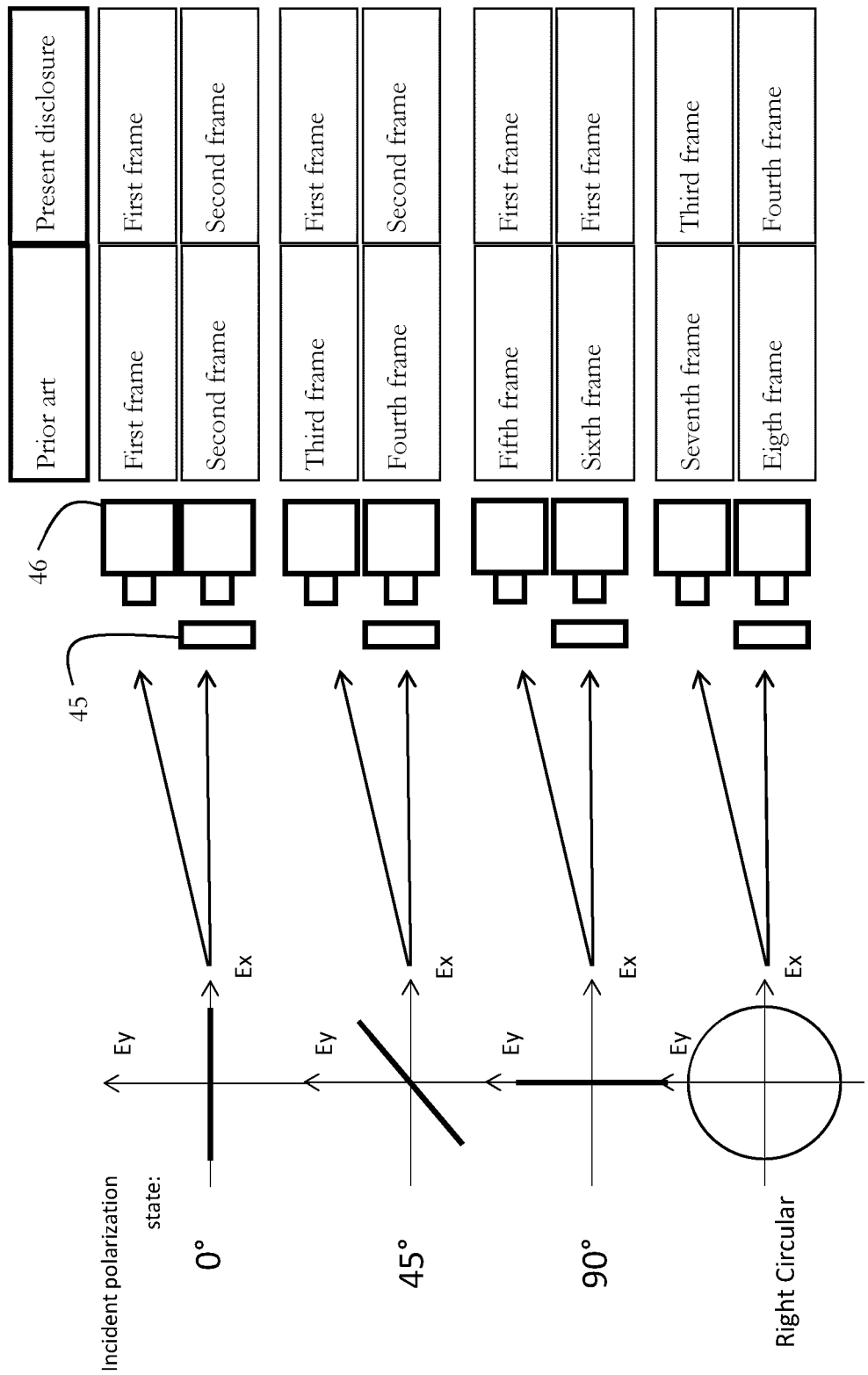
FIG. 4 displays a comparison of a polarization imaging system according to the present disclosure with a polarization imaging system known in the art.

FIG. 4 depicts four incident polarization states on the left, namely zero degrees linear polarization, forty-five degrees linear polarization, ninety degrees linear polarization, and right circular polarization symbolically depicted in graphs having components Ex and Ey on their axes for depicting the polarization of an electric field of light.

In the prior art, each relevant polarization state is acquired in consecutive eight frames, wherein after every second frame a wave retarder 45 is utilized before an acquisition with a polarization camera 46 (which, may, according to the present disclosure, include a polarizer portion stacked on a Bayer sensor, as discussed with respect to FIG. 1).

However, e.g. by using a polarization imaging system according to the present disclosure, such as a polarization imaging system 30 of FIG. 3, a total number of acquisitions may be reduced to four since the respective polarization are color coded. Moreover, full relevant information about linear polarization states may already be acquired within two frames (in comparison to six frames in the prior art).

Figure 5:
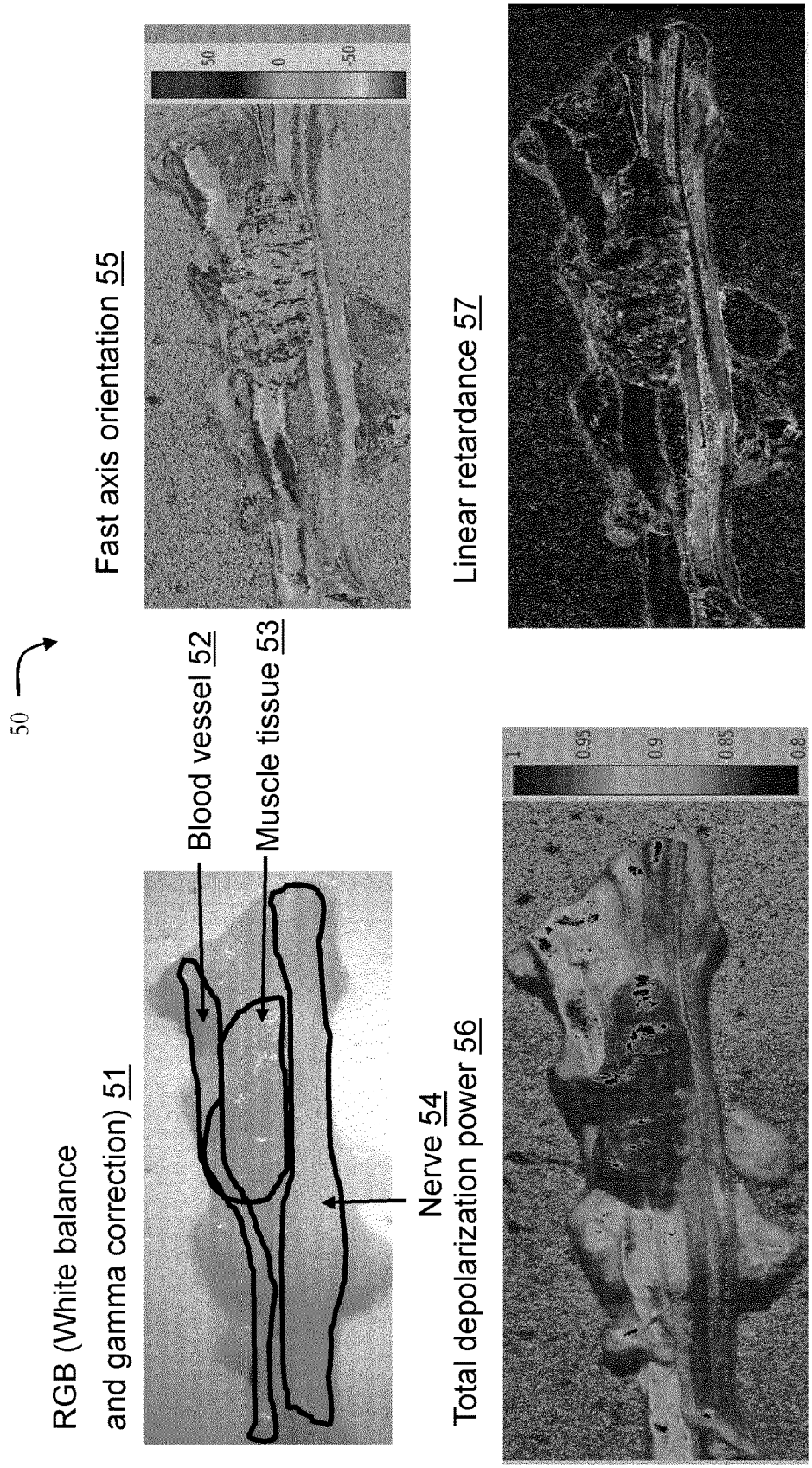
FIG. 5 depicts a plurality of measurement results obtained with a polarization imaging system according to the present disclosure.

FIG. 5 depicts a plurality of measurement results 50 obtained with a polarization imaging system according to the present disclosure.

On the upper left, an RGB image 51 is depicted (in greyscale), wherein a blood vessel 52, muscle tissue 53, and a nerve 54 are marked.

On the upper right, a fast axis orientation polarization image 55 is depicted (with an intensity scale on its right).

On the lower left, a total depolarization power polarization image 56 is depicted (with an intensity scale on its right).

On the lower right, a linear retardance polarization image 57 is shown.

As can be taken from FIG. 5, the features which are marked in the RGB image 51, are more distinguishable on the other images 55, 56, and 57.

Figure 6:
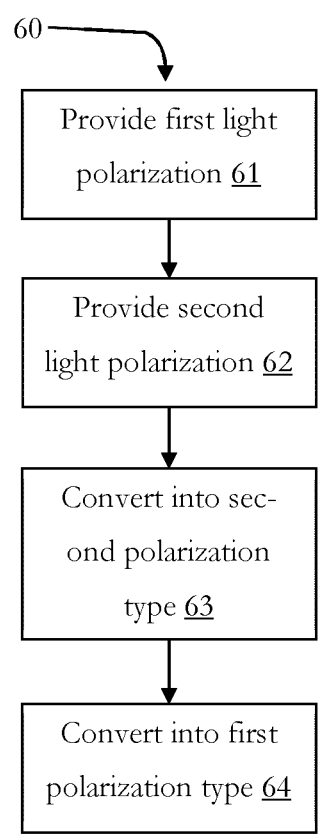
FIG. 6 depicts a polarization imaging method according to the present disclosure.

FIG. 6 depicts a polarization imaging method 60 according to the present disclosure in a block diagram, which can be performed, for example, with the polarization imaging system 30 of FIG. 3.

In 61, a first light polarization of a first polarization type for a first color channel element of a first color type is provided, as discussed herein, e.g. forty-five degrees for a green color channel.

In 62, a second light polarization of the first polarization type for a second color channel element of a second color type is provided, as discussed herein, e.g. ninety degrees for a red color channel.

In 63, the light of the first and the second color channel are converted into a second polarization type, as discussed herein, e.g. into a circular polarization for irradiating an object (e.g. a sample) with the circular polarization.

In 64, the (reflected) light (from the sample), which is of the second polarization type is converted into the first polarization type, whereby it is detectable in an imaging portion, as discussed herein.

Figure 7:
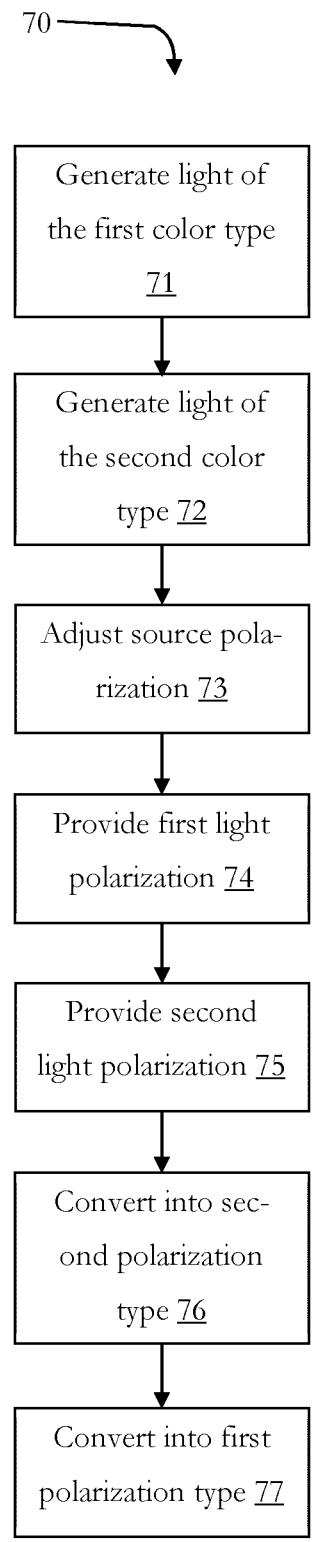
FIG. 7 depicts a further embodiment of a polarization imaging method according to the present disclosure.

FIG. 7 depicts a further polarization imaging method 70 according to the present disclosure in a block diagram being different from the polarization imaging method 70 in that it further includes a controlling of a light source. The polarization imaging method 70 may be performed with the polarization imaging system 30 of FIG. 3.

In 71, light of the first color type is generated, as discussed herein (e.g. a green color type).

In 72, light of the second color type is generated, as discussed herein (e.g. a red color type).

In 73, a source polarization of the first polarization type is generated, as discussed herein, for example by having a waveplate after a polarization recycling prism, as discussed with respect to FIG. 3, or by controlling a liquid crystal modulator to adapt a source polarization.

In 74, a first light polarization of a first polarization type for a first color channel element of a first color type is provided, as discussed herein, e.g. forty-five degrees for a green color channel.

In 75, a second light polarization of the first polarization type for a second color channel element of a second color type is provided, as discussed herein, e.g. ninety degrees for a red color channel.

In 76, the light of the first and the second color channel are converting into a second polarization type, as discussed herein, e.g. into a circular polarization for irradiating an object (e.g. a sample) with the circular polarization.

In 77, the (reflected) light (from the sample), which is of the second polarization type is converted into the first polarization type, whereby it is detectable in an imaging portion, as discussed herein.

It should be recognized that the embodiments describe methods with an exemplary ordering of method steps. The specific ordering of method steps is however given for illustrative purposes only and should not be construed as binding. For example, the ordering of 61 and 62 in the embodiment of FIG. 6 may be exchanged or may run in parallel. Also, the ordering of 71, 72 and 73 in the embodiment of FIG. 7 may be exchanged. Further, also the ordering of 74 and 75 in the embodiment of FIG. 7 may be exchanged. Other changes of the ordering of method steps may be apparent to the skilled person.

Please note that the division of the polarization imaging system 10 into units 21 and 22 is only made for illustration purposes and that the present disclosure is not limited to any specific division of functions in specific units. For instance, these elements 21 and 22 could be implemented by a respective programmed processor, field programmable gate array (FPGA) and the like.

The methods can also be implemented as a computer program causing a computer and/or a processor, such as the polarization circuitry 21 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A polarization imaging system comprising:
an imaging portion having a color channel element of a first color type and a color channel element of a second color type; and
a light polarization portion configured to:
provide a first light polarization of a first polarization type for the first color type and a second light polarization of the first polarization type for the second color type; and
convert a second polarization type into the first polarization type, whereby the second polarization type is detectable in the imaging portion.

(2) The polarization imaging system of (1), further comprising at least one tunable polarizer for converting the second polarization type into the first polarization type.

(3) The polarization imaging system of anyone of (1) and (2), wherein the first and the second polarization type include a linear and an elliptic polarization.

(4) The polarization imaging system of anyone of (1) to (3), wherein the imaging portion includes a Bayer image sensor.

(5) The polarization imaging system of (4), wherein the Bayer image sensor includes two green color channel elements, a red color channel element, and a blue color channel element.

(6) The polarization imaging system of (5), wherein for each color channel element a different polarization is provided.

(7) The polarization imaging system of anyone of (1) to (6), wherein at least one of the first and the second polarization is representative of an element of a polarization matrix.

(8) The polarization imaging system of (7), wherein the polarization matrix includes a Mueller matrix.

(9). The polarization imaging system of anyone of (1) to (8), further comprising:
a light source configured to generate light of the first color type and to generate light of the second color type.

(10) The polarization imaging system of (9), further comprising:
a polarizer configured to adjust a source polarization of the first polarization type for the generated light.

(11) The polarization imaging system of (10), wherein the source polarization of the light of the first color type differs from the light of the second color type.

(12) A polarization imaging method comprising:
providing a first light polarization of a first polarization type for a color channel element of a first color type and a second light polarization of the first polarization type for a color channel element of a second color type; and
converting a second polarization type into the first polarization type, whereby the second polarization type is detectable in an imaging portion including the first and the second color channel elements.

(13) The polarization imaging method of (12), wherein the first and the second polarization type include a linear and an elliptic polarization.

(14) The polarization imaging method of anyone of (12) and (13), wherein the imaging portion includes a Bayer image sensor.

(15) The polarization imaging method of (14), wherein the Bayer image sensor includes two green color channel elements, a red color channel element, and a blue color channel element.

(16) The polarization imaging method of (15), wherein for each color channel element a different polarization is provided.

(17) The polarization imaging method of anyone of (12) to (16), wherein at least one of the first and the second polarization is representative of an element of a polarization matrix.

(18) The polarization imaging method of (17), wherein the polarization matrix includes a Mueller matrix.

(19) The polarization imaging method of anyone of (12) to (18), further comprising:
generating light of the first color type; and
generating light of the second color type.

(20) The polarization imaging method of (19), further comprising:
adjusting a source polarization of the first polarization type for the generated light.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A polarization imaging system comprising:
an imaging portion having a color channel element of a first color type and a color channel element of a second color type;
a light polarization portion configured to:
in an optical path before an object:
receive light of the first color type and light of the second color type; and
as a first polarization, individually provide a first light polarization of a first polarization type for the light of the first color type and a second light polarization of the first polarization type for the light of the second color type, and
in an optical path after the object:
as a second polarization, convert a second polarization type into the first polarization type, whereby the second polarization type converted into the first polarization type is detectable in the imaging portion; and
control circuitry configured to control the second polarization based upon the first polarization.

2. The polarization imaging system of claim 1, further comprising at least one tunable polarizer for converting the second polarization type into the first polarization type.

3. The polarization imaging system of claim 1, wherein the first and the second polarization type include a linear and an elliptic polarization.

4. The polarization imaging system of claim 1, wherein the imaging portion includes a Bayer image sensor.

5. The polarization imaging system of claim 4, wherein the Bayer image sensor includes two green color channel elements, a red color channel element, and a blue color channel element.

6. The polarization imaging system of claim 5, wherein for each color channel element a different polarization is provided.

7. The polarization imaging system of claim 1, wherein at least one of the first and the second polarization is representative of an element of a polarization matrix.

8. The polarization imaging system of claim 7, wherein the polarization matrix includes a Mueller matrix.

9. The polarization imaging system of claim 1, further comprising:
a light source configured to generate the light of the first color type and to generate the light of the second color type.

10. The polarization imaging system of claim 9, further comprising:
a polarizer configured to adjust a source polarization of the first polarization type for the generated light.

11. The polarization imaging system of claim 10, wherein the source polarization of the light of the first color type differs from the light of the second color type.

12. A polarization imaging method comprising:
in an optical path before an object:
receiving light of a first color type and light of a second color type; and
as a first polarization, individually providing a first light polarization of a first polarization type for the light of the first color type and a second light polarization of the first polarization type for the light of the second color type,
in an optical path after the object:
as a second polarization, converting a second polarization type into the first polarization type, whereby the second polarization type converted into the first polarization type is detectable in an imaging portion including a color channel element of the first color type and a color channel element of the second color type, and
controlling the second polarization based upon the first polarization.

13. The polarization imaging method of claim 12, wherein the first and the second polarization type include a linear and an elliptic polarization.

14. The polarization imaging method of claim 12, wherein the imaging portion includes a Bayer image sensor.

15. The polarization imaging method of claim 14, wherein the Bayer image sensor includes two green color channel elements, a red color channel element, and a blue color channel element.

16. The polarization imaging method of claim 15, wherein for each color channel element a different polarization is provided.

17. The polarization imaging method of claim 12, wherein at least one of the first and the second polarization is representative of an element of a polarization matrix.

18. The polarization imaging method of claim 17, wherein the polarization matrix includes a Mueller matrix.

19. The polarization imaging method of claim 12, further comprising:
generating the light of the first color type; and
generating the light of the second color type.

20. The polarization imaging method of claim 19, further comprising:
adjusting a source polarization of the first polarization type for the generated light.

* * * * *